United States Patent [19]

Cros

[11] 4,331,020
[45] May 25, 1982

[54] DIMENSION INDICATOR FOR SHEET-METAL FOLDING OR SHEARING MACHINE TOOLS

[75] Inventor: Pierre G. Cros, Saint-Cloud, France

[73] Assignee: Promecam Sisson-Lehmann, Saint-Denis, France

[21] Appl. No.: 163,384

[22] Filed: Jun. 26, 1980

[30] Foreign Application Priority Data

Jul. 5, 1979 [FR] France .................................. 79 17458

[51] Int. Cl.³ .............................................. B21D 11/22
[52] U.S. Cl. ........................................ 72/461; 72/389; 83/468
[58] Field of Search ..................... 72/461, 389; 83/635, 83/468, 640, 641, 395, 522

[56] References Cited

U.S. PATENT DOCUMENTS

| | | | |
|---|---|---|---|
| 3,242,786 | 3/1966 | Giordano | 83/635 |
| 3,371,569 | 5/1968 | Pearson | 83/635 |
| 3,826,119 | 7/1974 | Marotto | 72/461 |
| 3,874,205 | 4/1975 | Roch | 72/461 |
| 3,892,155 | 7/1975 | Gerlach | 83/635 |
| 3,926,081 | 12/1975 | Roberts | 83/395 |
| 4,084,424 | 4/1978 | Roch | 72/461 |

FOREIGN PATENT DOCUMENTS

| | | | |
|---|---|---|---|
| 1033285 | 6/1978 | Canada | 83/640 |
| 1352089 | 12/1963 | France | 83/395 |

*Primary Examiner*—Gene Crosby
*Attorney, Agent, or Firm*—Young & Thompson

[57] ABSTRACT

This dimension indicator for sheet-metal folding, bending or shearing machine tools comprises a measuring apparatus capable of displaying the distance from the adjustable stop member provided for positioning the workpiece to a reference plane. The device comprises structure for correcting the consequence of a displacement of the reference plane, in the form of a mechanical device coupled to the machine adjustment member and adapted to act directly or indirectly upon one of the component elements of a coupling or a data transmission disposed between the member controlling the stop member and the measuring apparatus, so as to actuate this apparatus.

7 Claims, 8 Drawing Figures

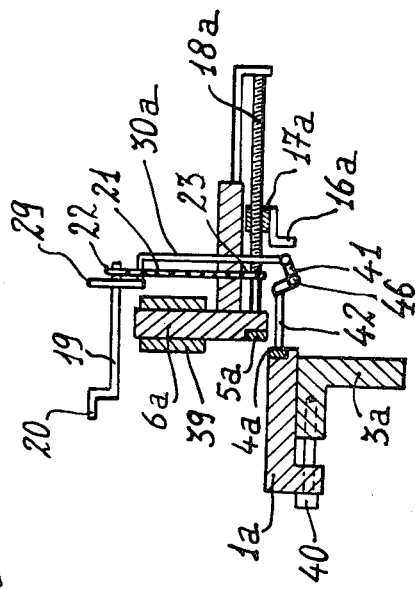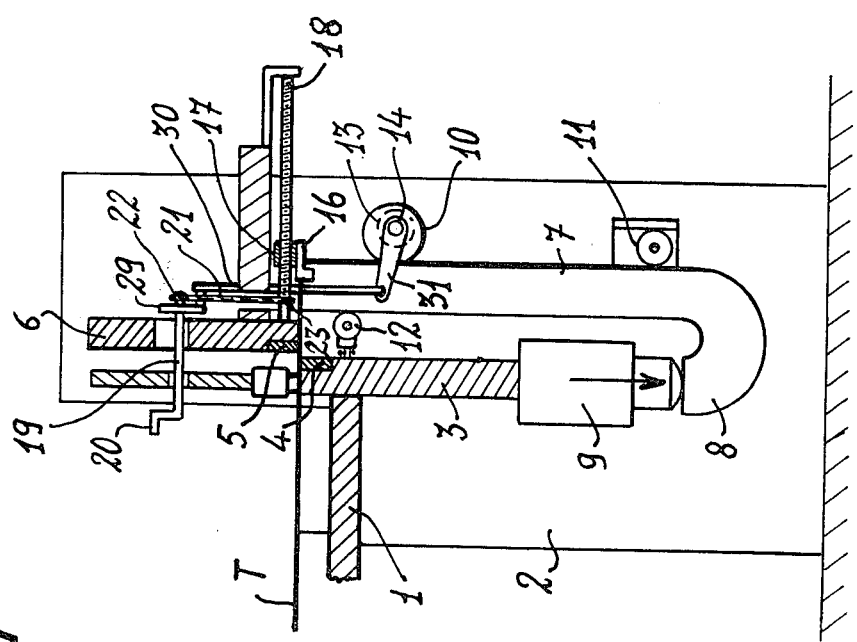

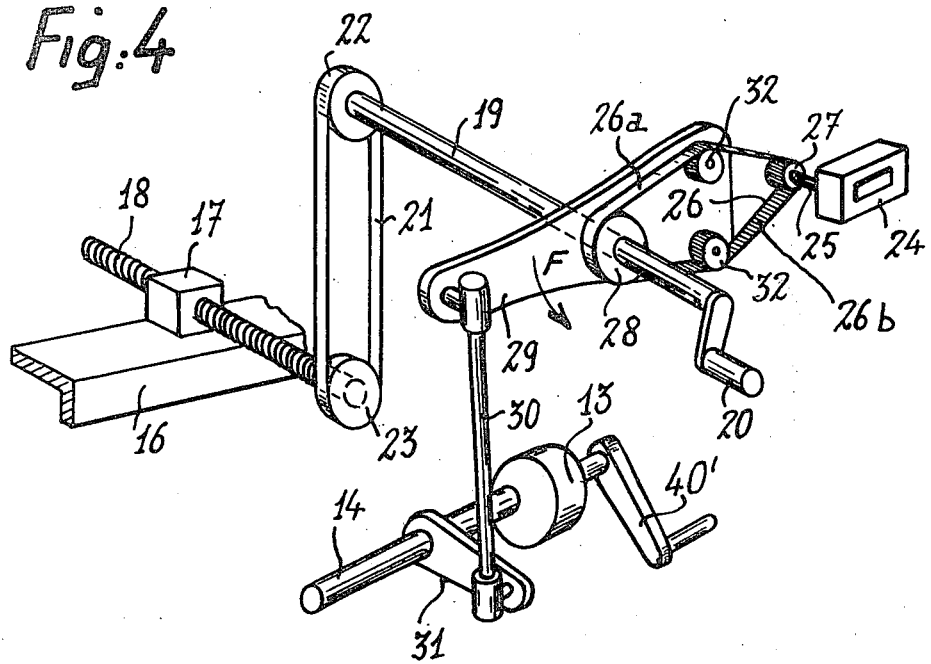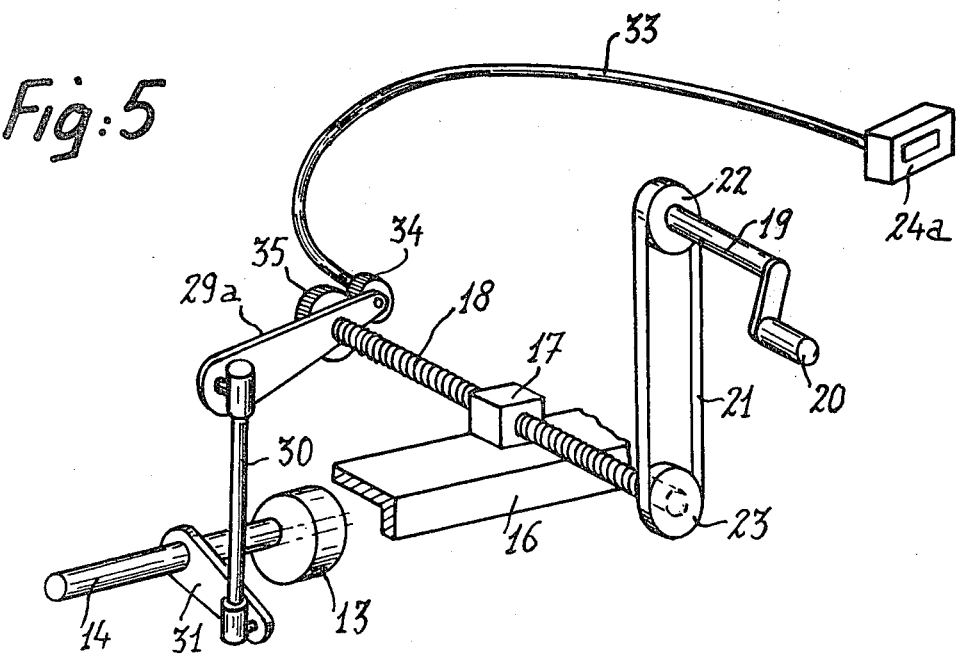

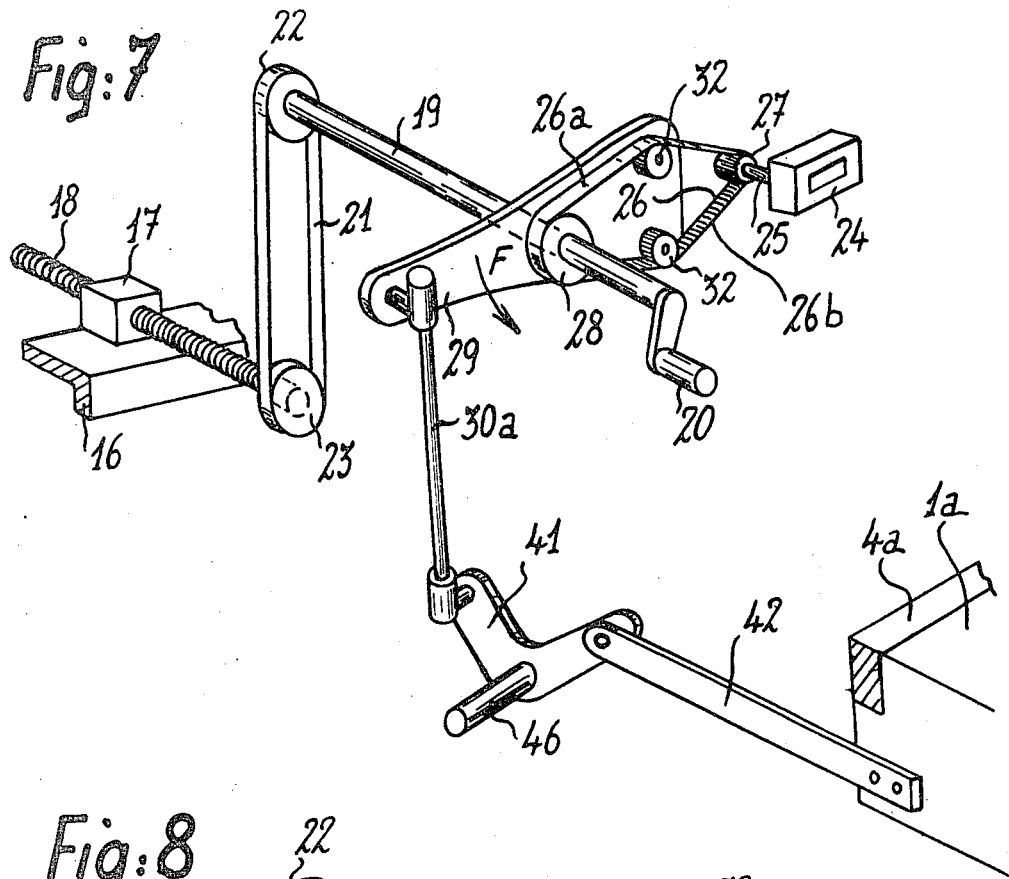
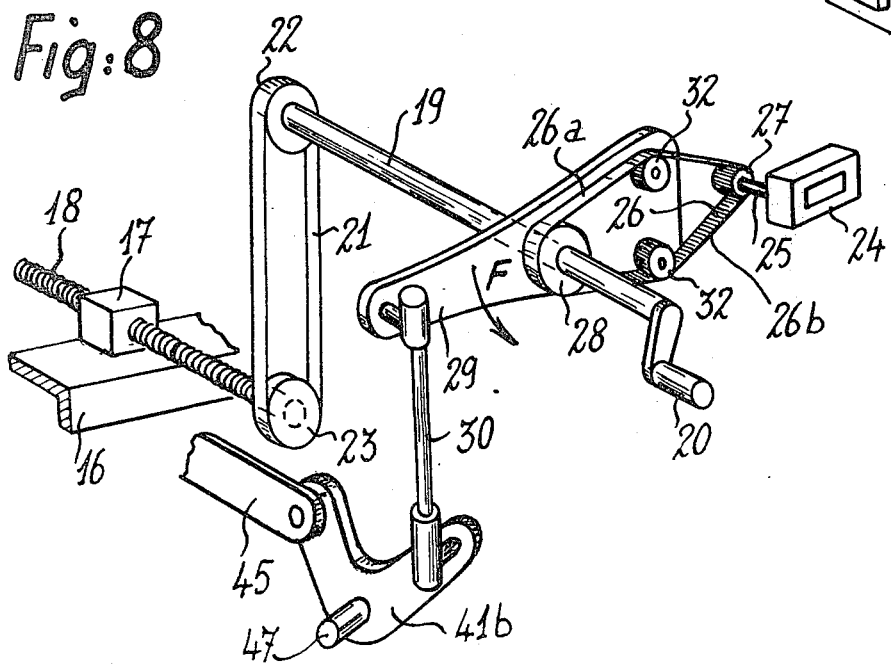

DIMENSION INDICATOR FOR SHEET-METAL FOLDING OR SHEARING MACHINE TOOLS

BACKGROUND OF THE INVENTION

1. Field of the Invention

The present invention relates to dimension indicators adapted for use in sheet-metal working machine tools, namely, sheet-metal shaping, folding or shearing machine-tools. Devices of this type comprise a measuring apparatus capable of displaying the distance of the adjustment stop for positioning the metal plate or sheet on the machine in relation to a reference plane such as the folding or shearing plane.

As a rule, in a machine of the type concerned, the movement of the positioning stop member is controlled by a generally double screw-and-nut mechanism. In this case, the stop member is rigid with a pair of nuts held against rotation and engaged by a pair of rotary drive screws. Thus, it is only necessary to control the rotation of these screws in one or the other direction for moving the positioning stop member forwards or backwards, as required. To this end, one of said screws is actuatable by means of a drive motor or a manual control member, for example a crank handle, and the other screw is operatively connected to said one screw through suitable mechanical coupling means.

Under these conditions, the measuring apparatus of the dimension indicator may consist of a mechanical or electronic counter controlling the movements of rotation of one of the screws driving the positioning stop member. In this case, the drive or transmission ratio is such that the data displayed by the counter show the actual value of the movement accomplished by the positioning stop member. Of course, a calibration is required, which consists in resetting the counter when the positioning stop member lies in the reference plane corresponding in general to the sheet bending or shearing plane.

However, for technological reasons, it may become necessary to change the position of the reference plane afterwards, and this obviously involves another calibration. For instance, in plate shears the play between blades must be modified as a function of the thickness of the plate to be cut, thus making it necessary to change the position of the reference plane with respect to the stop position.

Therefore, to preserve the efficiency of the dimension indicator under all circumstances, the operator must calibrate the machine-tool each time a change occurs in the play between the blades. Now, the same problem arises in the case of a folding machine when the setting thereof is modified.

SUMMARY OF THE INVENTION

It is therefore the essential object of the present invention to provide a dimension indicator for machine-tools of the type broadly mentioned hereinabove, this dimension indicator being so constructed that the data displayed thereby are reliable even after the position of the reference plane following the adjustment of the operation of the corresponding machine has been modified. To this end, this device is characterized essentially in that it comprises a system for correcting the effect produced by the shifting of the reference plane, this system comprising mechanical means coupled to the machine adjustment means and adapted to act directly or indirectly upon one of the elements of the coupling means or data transmission means provided between the positioning stop control member and the measuring apparatus, so as to eventually set this measuring apparatus.

According to an advantageous form of embodiment of the present device, the correction system thereof comprises a lever pivoted about a fixed axis and having one end operatively connected through a link mechanism to the rotary shaft of the machine adjustment member, the opposite end of said lever being connected to the coupling means or data transmission means inserted between the positioning stop control member and the measuring apparatus.

However, this connection system can be embodied in many different ways without departing from the basic principles of the invention, notably as a function of the type of measuring apparatus incorporated in the dimension indicator, this measuring apparatus consisting preferably and advantageously of a mechanical or electronic counter.

Various possible forms of embodiment of the device of this invention will now be described by way of illustration with reference to the attached drawings.

BRIEF DESCRIPTION OF THE DRAWINGS

FIG. 1 is a diagrammatic cross section showing a plate shearing machine provided with the dimension indicator according to this invention;

FIGS. 2 and 3 are fragmentary diagrammatic sectional views showing two other types of plate shears equipped with the device of this invention;

FIG. 4 is a perspective view showing a dimension indicator associated with the shearing machine of FIG. 1;

FIGS. 5 and 6 are perspective views showing two modified forms of embodiment of the dimension indicator according to the instant invention; and FIGS. 7 and 8 are enlarged perspective views of the correction means of FIGS. 2 and 3, respectively.

DESCRIPTION OF THE PREFERRED EMBODIMENTS

Figure 6:
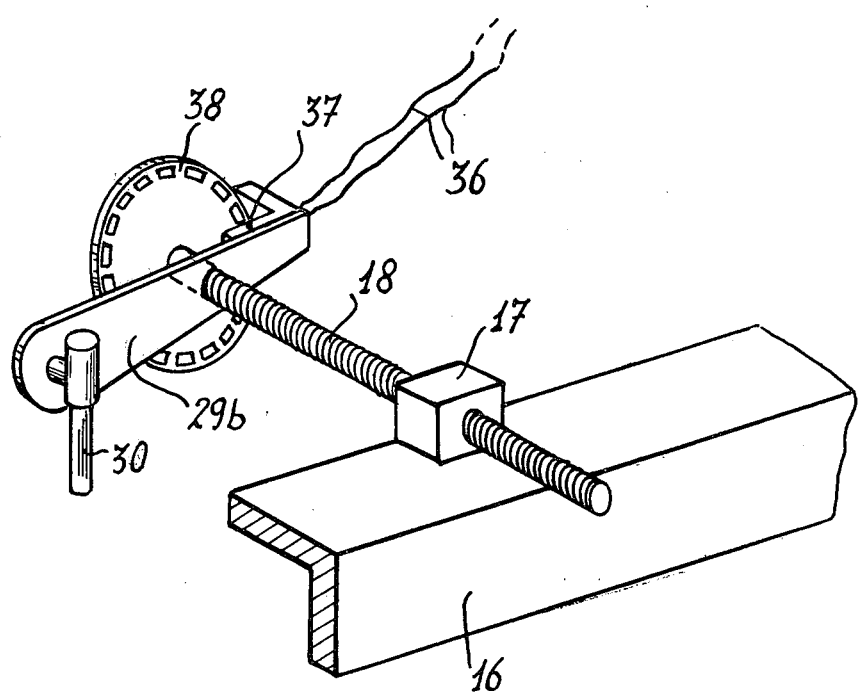

The plate shears illustrated in FIG. 1 are of the type in which the top blade supporting beam is movable in a vertical plane, the play between the top and bottom blade being adjustable by modifying or shifting the beam guide members. Otherwise, the plate shears may advantageously be similar to one of the many known machines of this type.

The plate shears comprise a table 1 rigid with two opposite lateral flanges 2 forming an integral part of the frame structure of the machine. The flanges 2 also carry a fixed beam 3 for supporting the fixed or bottom blade 4 of the machine. The other or movable top blade 5 of the machine is carried by a movable beam 6 driven and guided in a known fashion.

Therefore, the movable or top blade beam 6 is carried by a pair of movable vertical uprights 7 underlying the two side edges of beam 6 and lying therefore against the flanges 2 of the frame structure. The bottom ends 8 of these uprights bent to a "J"-like configuration are responsive to the outer or operative end of a control actuator or cylinder 9.

Each lateral upright 7 is guided on one side by two pairs of rollers 10 and 11, respectively, with the rollers of one pair underlying those of the other pair. On the opposite side, a simple presser roller 12 responsive to one or a plurality of thrust springs is provided. Each upper guide roller 10 is rotatably mounted about an eccentric disc 13 which, when rotated about its axis, permits of shifting the line of contact between the guide roller 10 and the registering face of the corresponding upright 7. Now, it is this shift that enables the play existing between the two blades 4 and 5 of the shearing machine to be adjusted as a function of the thickness of the plate T to be cut.

The control eccentric 13 is rigid with a control shaft 14 provided at one end with a crank handle 40' or any other suitable drive member. Thus, by rotating the eccentric 13 about its axis the operator can adjust the play between the two blades 4 and 5.

On the other hand, the machine comprises an angle-iron or like section 16 extending horizontally behind the cutting plane of the machine and adapted to act as a stop member for properly positioning the plate T to be cut. For this purpose, this section member 16 is movable towards or away from the blades and its position is adjustable. To this end, the stop member 16 carries a pair of nuts 17 held against rotation and engaged by corresponding rotary driving screws 18. One screw 18 is adapted to be rotated by means of a suitable mechanism or a motor. In the example illustrated, a manually operated driving mechanism is provided, which comprises a rotary shaft 19 provided with a control crank handle 20 and having its opposite end operatively connected to the corresponding screw 18, for example through a cogged belt 21 passing over matching pulleys 22, 23 carried by the drive shaft 19 and screw 18, respectively.

The other screw 18 (not shown in the drawings) is operatively connected through a suitable coupling mechanism (not shown) to the first screw. Thus, rotating the shaft 19 in one or the other direction will move the positioning stop member 16 towards or away from the blades 4, 5.

A dimension indicator according to this invention is associated with this plate positioning system and comprises a measuring apparatus capable of displaying the distance measured from the adjustable stop member to a reference plane, for example the shearing plane.

In the example illustrated in FIG. 4, this measuring apparatus comprises a mechanical counter 24 having its input shaft 25 coupled to the shaft 19 controlling the adjustable positioning stop member via a cogged belt 26 or a transmission chain passing over pulleys or sprockets 27, 28, rigid with said shafts, respectively.

However, according to the essential object of the present invention, the dimension indicator comprises means for correcting the effect produced by the shifting of the reference plane; more particularly, in the present example the cutting plane will be shifted as a consequence of a change occurring in the play contemplated between the blades 4 and 5. To this end, the correction means are adapted to shift the zero of the measuring counter 24 in one or the other direction, as required.

In the example described herein, this correction system comprises a lever 29 fulcrumed to shaft 19 and having one end operatively connected to the shaft 14 controlling the adjustment of play between said blades 4 and 5, for example through a rod 30 and a crank arm 31. The opposite end of this lever 29 carries a pair of pulleys 32 over which the belt 26 is passed. Besides, these pulleys are adapted to tension the two spans 26a and 26b of belt 26.

This dimension indicator operates in the normal way. In fact, when the angle-iron 16 constituting the plate positioning stop member is moved by rotating the drive shaft 19, the input shaft 25 of the counter is rotated by means of said belt 26. Now the drive ratio is such that the data displayed by this counter correspond to the distance from the positioning stop member 16 to the reference plane, namely the cutting plane.

However, if as a consequence of the change occurring in the play between blades 4 and 5 the position of this cutting plane were shifted, the correction means provided in the present device would automatically compensate the shift resulting therefrom. In fact, in this case the rotation of shaft 14 controlling the adjustment of the play between the shearing blades will also control the pivoting movement of lever 29 in the corresponding direction, thus causing the counter input shaft 25 to rotate. Thus, if lever 29 is caused to pivot in the direction of the arrow F (FIG. 4), the two belt tension pulleys 32 will move upwards and the upper span 26a will be elongated while reducing the length of the lower span 26b, so that pulley 27 and the counter input shaft 25 rigid therewith will rotate.

Of course, the dimensions of the pulleys and distances between centers should be properly calculated so that the elongation of the upper belt span 26a will be equal to the reduction in length of the lower span 26b, in order to keep the belt 26 tight while causing a slight rotation of pulley 27 to ensure the desired shifting of the zero position of counter 24. Of course, when the lever 29 is pivoted in the opposite direction the counter's zero is shifted similarly but in the other direction.

Therefore, with the correction system provided in the present dimension indicator the operator is not compelled to calibrate the device each time the reference plane is shifted as a consequence of a change brought in the clearance between the two blades.

FIGS. 5 and 6 illustrate two different forms of embodiment of the device of this invention.

In the case illustrated in FIG. 5, the measuring apparatus of the device consists likewise of a mechanical counter 24a. However, this counter is driven through a flexible or Bowden cable 33 having its opposite end rigidly connected to a pinion 34 in constant meshing engagement with a driving pinion 35. This driving pinion 35 is carried by the screw rod 18 the rotation of which controls the movement or shift of the plate positioning stop member 16 fitted to the machine. Thus, when the screw rod 18 is rotated, the counter 24a is driven with a ratio such that the data displayed by the counter will correspond to the distance measured between the movable stop member 16 and the reference plane.

In this specific form of embodiment of the device, the correction means provided for compensating the shifting of this plane comprises as in the preceding examples of a pivoting lever 29a having one end coupled to the shaft 14 controlling the adjustment of the clearance between blades 4 and 5, this coupling consisting of a rod 30 and a crank arm 31. The lever 29a is fulcrumed about the screw rod 18 and its opposite end supports a pinion 34 rigid with the Bowden or like cable 33 driving the counter 24a.

Under these conditions, any pivotal movement of lever 29a in one or the other direction, as a consequence of a rotation of drive shaft 14, is attended by a change in the position of pinion 34 about the outer periphery of driving pinion 35. Now, since the two pinions are in constant driving engagement with each other, this movement will be attended by a rotation of pinion 34 in one or the other direction and therefore by a corresponding shifting of the zero position of counter 24a. Thus, the result obtained is exactly the same as in the preceding example.

In the other modified structure illustrated in FIG. 6, the measuring apparatus of the dimension indicator comprises an electronic counter (not shown) coupled via electric conductors 36 to a pulse pick-up mounted to the end of the rotary screw 18 controlling the plate positioning member 16. This pulse pick-up may consist for example of a photocell 37 associated with a light source, these two elements being disposed on either side of the outer peripheral marginal portion of a disc 38 rigid with said screw 18 and having a circular row of apertures formed therein. Thus, the cell 37 will pick up the pulses delivered by this disc during its rotation, whereby the electronic counter will be capable of displaying the distance measured between the positioning stop member 16 and the reference plane.

The correction means contemplated in this device comprise as in the preceding case a pivoting lever 29b having one end coupled through a rod 30 and a crank arm (not shown) to shaft 14 controlling the clearance between the two blades of the shearing machine. This lever 29b is pivotally mounted on the screw rod 18 and its opposite end supports the cell 37 of the pulse pick-up. Therefore, this cell 37 will take different angular positions during the movements of lever 29b.

Now, this pivotal movement may take place in either direction, each time the shaft 14 provided for adjusting the clearance between the blades 4, 5 is actuated. Therefore, this movement is attended by a corresponding change in the position of cell 37, and consequently by a shift in the zero position of the electronic counter associated therewith.

However, it is clear that the various forms of embodiment described hereinabove with reference to the attached drawings should not be construed as limiting the scope of the invention, since many other modifications may be brought thereto without departing from the basic principles of the invention, as will readily occur to those conversant with the art, notably as a function of the type of measuring apparatus incorporated in the device and also of the coupling means contemplated between this apparatus and the member controlling the movement of the plate positioning stop member 16.

In these various cases, it is only necessary and sufficient that the kinematic transmission means provided in the correction system be substantially linear ones, but this requirement is easily met since the movements involved are extremely short.

Besides, it will be seen that the dimension indicator according to this invention can be fitted to plate shearing or folding machines of various types. Thus, the device according to the instant invention is applicable to plate shears of a type other than the one shown diagrammatically in FIG. 1. On the other hand, FIG. 2 illustrates in fragmentary section a shearing machine of different construction provided with the device of this invention.

In this plate shearing machine, the beam 6a supporting the movable or top blade 5a is guided in fixed vertical guideways 39 and the clearance between the pair of cooperating blades is adjusted by moving a table or beam 1a supporting the fixed or bottom blade 4a. To this end, the table 1a is mounted for horizontal forward and backward reciprocation on the fixed beam 3a of the plate shears and the movement thereof may be controlled by means of adjustment screws 40.

The mechanism controlling the adjustable plate-positioning stop member 16a is the same as that incorporated in the plate shearing machine illustrated in FIG. 1. In fact, this stop member carries a pair of nuts 17a held against rotation and engaged on rotary screw rods 18a, one of which is rotatably driven from a motor or a suitable mechanism. In the example illustrated, a control mechanism comprising a shaft 19 rigid with a crank handle 20 and coupled to the relevant screw rod 18a by means of a belt 21 is provided. This mechanism is associated with a dimension indicator proper comprising a correction system according to the present invention. This device may comprise one of the different forms of embodiment illustrated in FIGS. 4, 5 and 6.

Therefore, in either case, the device comprises a pivoting lever 29 (or 29a, 29b, respectively) having one end adapted, during its angular movement, to shift the zero position of the corresponding measuring apparatus. The other end of this lever is operatively connected to the mechanism provided for adjusting the clearance between the two blades.

However, in the specific case of the plate shears illustrated in FIG. 2, the coupling means differ from those provided in the machine shown in FIG. 1. More particularly, the relevant end of the two-armed lever 29 (or 29a, 29b) is coupled via a pair of rods 30a, 42 to the movable table 1a to which the bottom or fixed blade 4a is fastened. The pair of rods 30a and 42 themselves are interconnected by means of a bell-crank lever 41 fulcrumed to a fixed pivot pin 46, as better seen in FIG. 7.

Thus, any translation of table 1a in one or the other direction for modifying the clearance between the blades is attended by a pivotal movement of lever 29 (or 29a, 29b) in the corresponding direction. This involves automatically a shift of the zero position of the measuring apparatus of the dimension indicator.

FIG. 3 illustrates another type of shears equipped with the dimension indicator according to this invention. In this case, the machine comprises a movable beam 6b provided with a pair of side flanges 43 fulcrumed to a pair of eccentric trunnions 44. Since the fixed blade 4b is carried by a beam 3b having a fixed position, the clearance between the blades can only be altered by rotating the trunnions 44 about their axes to move the top blade 5b towards or away from the fixed blade 4b.

The mechanism controlling the positioning stop member 16b of this shearing machine is the same as that disclosed hereinabove. Therefore, it comprises a drive shaft 19 adapted to rotate one of the control screw rods 18 via a belt 21.

This mechanism is associated with a dimension indicator provided with a correction system capable of compensating the effect produced by a shift of the reference plane. As in the preceding example, this correction system comprises a pivoting lever 29 (or 29a, 29b) having one end adapted, through its movement, to shift the zero position of the measuring apparatus of the relevant dimension indicator. The other end of lever 29 (or 29a, 29b) is coupled to the mechanism controlling the adjustment of the clearance between the two blades of the machine.

In the present case, this coupling comprises a rod 45 providing a suitable connection between the lever 29 and the eccentric trunnions 44 controlling the adjustment of the clearance between the two blades, said rod being operatively connected to said lever 29 by means of a bell-crank lever 41b fulcrumed to a fixed pivot pin 47 as better seen in FIG. 8. Thus, the arrangement is such that when said eccentric trunnions 44 are rotated in one or the other direction to change the clearance between the machine blades, the lever 29 is pivoted in the corresponding direction, thus producing the proper shift of the zero position of the measuring apparatus incorporated in the dimension indicator.

But as already explained in the foregoing, the device of this invention may be embodied in many other ways, notably as a function of the type of machine to which it is to be fitted, and also of the specific nature of the measuring apparatus contemplated for displaying the position of the plate positioning stop member and also of the transmission means provided between the measuring apparatus and the plate positioning stop member control mechanism. Thus, in the case illustrated in FIG. 4, the input shaft of counter 24 is coupled to shaft 19 controlling the mechanism for moving the stop member of beam 16, but it would not constitute a departure from the basic object of this invention to couple said input shaft to one of the screw rods 18, and in this case the correction system would be modified accordingly. This is illustrated on the other hand in FIG. 5, showing that the Bowden or like cable 33 could as well be attached to the drive shaft 19 instead of being connected to screw rod 18. Similarly, in the example shown in FIG. 6, the pulse detector could be mounted on the shaft driving the screw 18 instead of being mounted directly on this rod 18.

Finally, it will readily occur to those skilled in the art that the device according to the instant invention could be fitted to all plate-working machine tools and not only to plate shears. Thus, the dimensions indicator of this invention could be mounted on plate shaping machines such as bending presses and folding presses as well.

I claim:

1. A dimension indicator adapted to be mounted on a sheet-metal working machine tool having a metal working tool whose position determines a reference plane and having means for moving said tool to change the position of said working plane and having an adjustable sheet-positioning stop member for positioning sheet metal in a predetermined position relative to said reference plane, said indicator comprising means to measure and display the distance of said adjustable sheet-positioning stop member from said reference plane, and means responsive to changes in position of the reference plane as a result of changes in position of said tool, to correct the display of said distance.

2. An indicator as claimed in claim 1, said means for moving said tool comprising an eccentric rotatable on a fixed shaft, means for rotating said eccentric to move said tool in a direction to move said reference plane, and means responsive to rotation of said eccentric to correct said display.

3. An indicator as claimed in claim 1, said means responsive to changes in position of said reference plane comprising a crank mounted for pivotal movement about a fixed axis, said crank having one arm connected by link means to said tool and another arm connected by link means to said measuring means to change the display of said measuring means upon movement of the tool to change the position of said reference plane.

4. Apparatus as claimed in claim 1, and means to change the position of the adjustable sheet-positioning stop member comprising a rotatable shaft, means connecting the rotatable shaft to the measuring apparatus to measure said distance according to the rotation of said shaft, a member pivotally mounted on said shaft for pivoting movement responsive to changes in position of said tool, and means connecting said pivoting member with said means connecting said shaft to said measuring apparatus whereby swinging movement of said pivotal member in one direction or the other adds to or substracts from the distance display of said indicator.

5. An indicator as claimed in claim 4, said pivotally mounted member carrying at least one wheel meshing with a chain that is also in mesh with a wheel on said shaft and with said measuring apparatus, the first-mentioned wheel being spaced from said shaft.

6. An indicator as claimed in claim 4, said pivotally mounted member carrying a gear that meshes with a gear that is on and coaxial with said shaft, the first-mentioned gear being connected to said measuring apparatus.

7. An indicator as claimed in claim 4, and a disc secured to said shaft and having apertures therethrough, a photoelectric cell secured to said pivotally mounted member for viewing said apertures upon rotation of said disc, said photoelectric cell transmitting to said measuring apparatus a series of pulses whose number varies according to the amount of rotation of said shaft and the degree of swinging of said pivotally mounted member.

* * * * *